Figure 1:
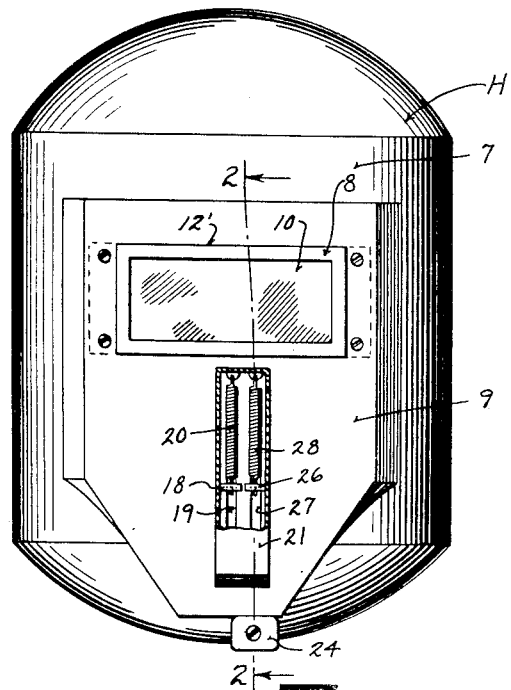

Jan. 22, 1957         E. S. MORRELL         2,778,928
WELDER'S HELMET AND ARC CURRENT CONTROLLING APPARATUS
Filed Feb. 21, 1955         2 Sheets-Sheet 1

INVENTOR
EDWARD S. MORRELL

BY

*Young and Wright*

ATTORNEYS

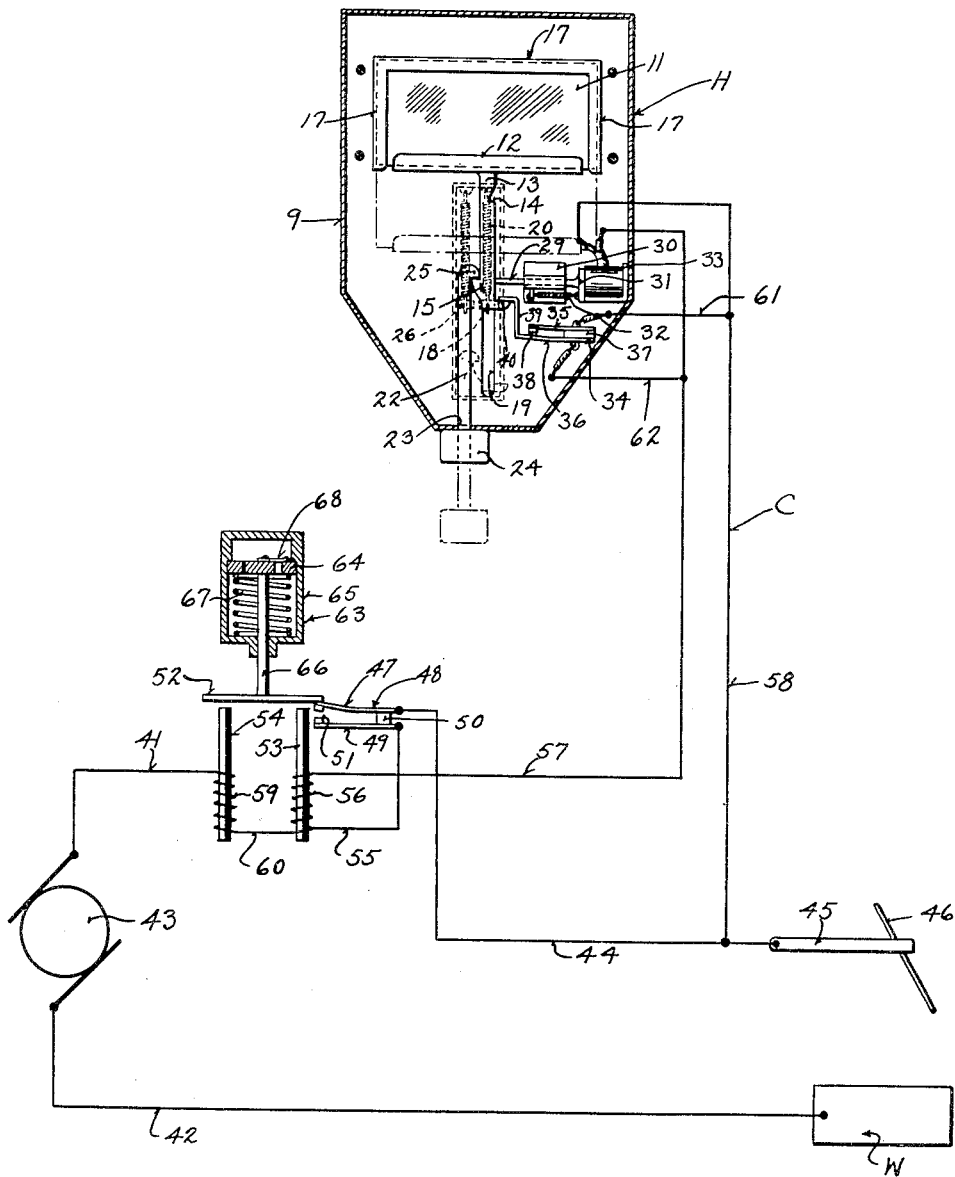

United States Patent Office 2,778,928
Patented Jan. 22, 1957

2,778,928

WELDER'S HELMET AND ARC CURRENT CONTROLLING APPARATUS

Edward S. Morrell, Chippewa Falls, Wis., assignor to George Toebe, Chippewa Falls, Wis.

Application February 21, 1955, Serial No. 489,660

7 Claims. (Cl. 219—147)

This invention appertains to welders' helmets and more particularly to a novel arrangement of visors or shutters therefor and arc current controlling apparatus.

It is customary in the welding art to provide a helmet with a clear protecting glass for the eyes and a dense dark glass movable over the clear glass upon the starting of the welding operation to protect the welder's eyes from the glare of the welding arc and the harmful rays given off thereby. When the dark glass is in its operative protecting position and before the start of the welding operation, it is impossible for the welder to clearly see the work and the exact point of placement of the weld rod on the work. Consequently, it is usual for the welder to start his welding operation and then quickly move the dark glass to its protecting position. However, the second the arc is struck, the intense flash seriously affects the welder's eyes.

It is, therefore, one of the primary objects of my invention to provide novel means for automatically moving the dark glass to its operative protecting position when the welding rod touches the work and at a fraction of a second before the main welding circuit is closed, whereby to insure the proper placing of the weld rod on the work at the exact point and without the usual accompanying flash of the welding arc.

Another salient object of my invention is the provision of means incorporated in the arc welding circuit for initially closing a circuit through a magnet employed for operating the dark glass and thereafter and practically instantaneously therewith, closing the main welding circuit and shunting the circuit from the magnet for the dark glass.

A further important object of my invention is the provision of means actuated, upon energizing of the magnet, for the dark glass or shutter, for closing a switch to bring about the shunting of the magnet and the energizing of a second magnet for operating a main switch to close the main welding circuit.

A still further object of the invention is the provision of a simple means incorporated directly with the helmet including the shutter magnet for bringing about the effective operation of the dark glass or shutter upon the energizing of the shutter control magnet, the structure being such that a compact and durable arrangement is had.

A still further important object of my invention is the provision of a welder's helmet having a visor thereon for the welder's eyes including a stationary clear glass and a vertically slidable dark glass or shutter normally urged to an operative position in front of the clear glass by spring means with a manually operated rod normally free of the shutter for moving the shutter to a lowered inoperative position against tension of the spring means, and a spring urged latch for operative engagement with the shutter to hold the same in its lowered position, and a magnet energized upon the engagement of the weld rod with the work for releasing the latch, the upward movement of the shutter also functioning to close a switch for bringing about the by-passing of the current from the magnet and to bring about the closing of the main welding switch.

Figure 2:
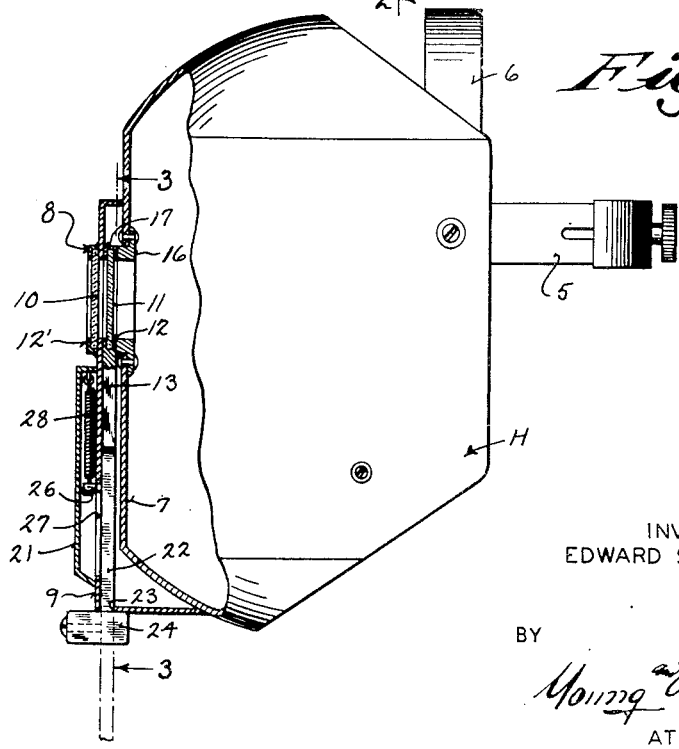

With these and other objects in view, the invention consists in the novel arrangement, formation and construction of parts, as will be hereinafter more specifically described and claimed, and illustrated in the accompanying drawings, in which drawings, Figure 1 is a front elevational view of my improved helmet, parts of the view being shown broken away and in section to illustrate structural detail;

Figure 2 is a side elevational view of the helmet with parts thereof in section, the parts in section being taken on the line 2—2 of Figure 1, looking in the direction of the arrows, and Figure 3 is a sectional view taken at right angles to Figure 2 and on the line 3—3 of Figure 2, looking in the direction of the arrows, the view also showing diagrammatically the wiring circuits.

Referring to the drawings in detail, wherein similar reference characters designate corresponding parts throughout the several views, the letter H generally indicates the improved helmet and C the novel welding circuits used in conjunction with the helmet and forming a part of the invention.

The helmet H is in the form of a shield for covering the front and sides of the face and can be provided with a back head strap 5 and a top head strap 6. The exact form of this shield can be varied to suit the individual tastes of different welders. However, in accordance with my invention the front wall 7 of the shield is provided with a visor 8 for the eyes of the welder and a compact casing or box 9 for housing certain operative parts of this invention. The visor 8 includes a stationary clear glass 10 and when the helmet is in position on the head of the user unobstructed vision can be had through this glass. Mounted for vertical sliding movement in the casing 9 in front of and below the clear glass 10 is a dark glass or shutter 11. This dark glass is carried by a frame bar 12 having formed on or secured to its lower edge a depending shank 13. The shank is provided with a keeper notch 14 and a catch nose 15. The purpose of the keeper notch 14 and the nose 15 will later appear. Referring back to the visor 8, the front wall of the shield and the front wall of the casing 9 are provided with aligned openings and the clear glass 10 is secured in a frame 12′ welded or otherwise fastened to the casing 9 around the window opening. Secured in the window opening of the front wall 7 of the shield is a window frame 16 carrying guides 17 for the top and sides of the dark glass shutter.

Formed on or secured to the shank 13 is a forwardly projecting guide finger 18 and this finger is slidably mounted in a guide slot 19 formed in one wall of the casing or box 9. A contractile coil spring 20 is connected at its lower end to the guide finger 18 and at its upper end to the top wall of a cover plate 21 utilized to enclose the spring 20 and to hide the slot 19. The cover plate 21 can be secured in place on the casing 9, in any desired way.

Slidably supported by the casing 9 is an operating rod 22 which extends through a guide opening 23 in the lower end of the casing 9. This operating rod is provided with an exposed hand grip 24. The upper end of the rod is provided with a nose 25 for inter-engagement with the nose 15 on the shank 13. Formed on or secured to the operating rod 22 is a guide finger 26 which extends through a guide slot 27 formed in one wall of the casing 9. This guide slot 27 extends in spaced parallel relation to the guide slot 19 and a contractile coil spring 28 is connected to the guide finger 26 and to the upper wall of the cover plate 21. This spring functions to normally hold the operating rod in a raised position. The spring 20 functions to hold the dark glass or shutter in its raised position directly in back of the clear glass 10. It can be seen, however, that by pulling down on the hand grip 24 and the rod 22 the nose 25 will engage the nose 15 and hence draw the shank 13 and the dark glass or shutter 11 therewith. Mounted within the casing 9 for horizontal sliding movement is a latch bar 29. A guide bracket 30 rigidly mounted within the casing 9 slidably supports the latch bar. Formed on or carried by the inner end of the latch bar is an armature 31 and a contractile coil spring has its opposite ends connected respectively to the armature and the guide bracket 30. Consequently, the latch bar 29 is normally urged toward the shank 13 and when the shank 13 is lowered the latch bar 29 engages in the keeper notch 14 and holds the shank and the dark glass or shutter 11 in their lowered position. Also arranged within the casing 9 and rigidly mounted therein is an electromagnet 33 and when the magnet is energized, the armature 31 is attracted, moving the latch bar 29 out of the notch 14 and the dark glass or shutter 11 will move under influence of its spring 20 to a raised operative position in rear of the clear glass. Also arranged within the casing 9 is a control switch 34 and this control switch is actuated and held in a circuit closing position by the raising of the shank 13 as will also later appear. The switch 34 may take different forms, but as illustrated, the same includes a conductor leaf 35 and a resilient conductor leaf 36. The leaves have their outer ends rigidly connected to a supporting block of insulation 37. The leaves adjacent to their inner ends carry mating contact points 38. The inherent resiliency of the leaf 36 is such as to normally hold this leaf out of electrical contact with the leaf 35. Formed on the inner end of the leaf 36 is a trip arm 39 arranged in the path of a trip lug 40 formed on or carried by the extreme lower end of the shank 13. When the shank 13 is in its completely raised position, the lug 40 engages the trip arm 39 and moves the leaf 36 upwardly into electrical contact with the leaf 35.

In conjunction with the helmet and the parts just described, I utilize a novel wiring circuit C which will now be set forth in detail. This circuit C includes heavy duty welding lines 41 and 42 which lead from any suitable source of electrical energy or power such as a generator 43. As in the usual practice, the wire 42 leads to and is electrically connected with the work W. A branch main welding line or wire 44 is connected electrically with the holder 45 for the weld rod 46 and this wire is electrically connected to one leaf 47 of a main switch 48. This switch 48 also includes a leaf 49 and the leaves are secured to and are mounted on an insulating block 50. The leaves at their forward ends carry contact points 51 and the leaf 47 is normally held in a raised non-circuit closing position by its inherent resiliency. This spring leaf 47 is arranged in the path of movement of an armature 52 upon the attraction thereof by electromagnets 53 and 54. The leaf 49 of the spring 48 has electrically connected therewith a conductor 55 which is electrically connected to one terminal of the windings 56 of electromagnet 53. The other terminal of the windings 56 has electrically connected therewith a conductor wire 57 which leads to one terminal of the electromagnet 33 in the welder's helmet and the other terminal of this magnet 33 has electrically connected therewith a conductor wire 58 which is electrically connected to the wire 44 between the weld rod 46 and the switch 48. The wire 41 is electrically connected to one terminal of the windings 59 for the electromagnet 54 and the lower terminal of this winding 59 is electrically connected with a conductor wire 60 which is joined with the lower terminal of the windings 56 for the magnet 53. The main wiring circuit includes wire 42, work W, weld rod 46, wire 44, switch 48, wire 55, wire 60, windings 59 and wire 41 through the generator. The leaves 35 and 36 of the switch 34 are electrically connected respectively to the wires 58 and 57 by conductors 61 and 62.

In operation, and considering that the dark glass or shutter 11 is held in its lowered inoperative position by the latch bar 29 and the welding job is ready to start; the welder peering through the clear glass 10 has full vision of the work W, and the weld rod 46 and the welder now places the weld rod on the work at the exact desired point to start the weld and the current flow is as follows: from generator 43, through wire 42, work W, weld rod 46, wire 58 through magnet 33, wire 57 through windings 56 and 59 through wire 41 to generator. At this time, the magnet 33 is energized and the current is insufficient to energize the magnets 53 and 54 to attract the armature 52 for operating the normally open main switch 48. However, immediately upon the energizing of the magnet 33, the latch bar 29 is operated and the dark glass or shutter 11 is moved to its raised operative position and when the shutter reaches this position the trip lug 40 engages the trip leg 39 of the switch 34 and moves contact leaf into electrical contact with leaf 35 and the magnet 33 is shunted. Current flow for the moment is as follows: from generator 43, wire 42, work W, weld rod 46, conductor 58, wire 61, through switch 34, wires 62 and 57, through windings of magnets 53 and 54 and wire 41 to generator 43. With the shunting of magnet 33, current flow through magnets 53 and 54 is sufficient to attract armature 52 and this closes switch 48. Current flow is now as follows: from generator 43, through wire 42, work W, weld rod 46, conductor 44, switch 48, wire 55, through magnet 54 and through wire 41 back to the generator 43.

The welding operation is continued in the normal fashion and the welder's eyes have been completely protected from the initial flash of the welding arc. When the welding job is completed, the welder again pulls down on the hand grip 24 and resets the dark glass or shutter 11 in its lowered inoperative position.

In order to effectively hold the switch 48 closed after the actuation thereof by the armature against momentary fluctuations, I provide a dash pot 63. This dash pot can be of a type now found in the open market and hence is only shown diagrammatically in the drawings. As illustrated, the dash pot includes a piston 64 reciprocally mounted within a cylinder 65 containing oil or other suitable liquid. Secured to the piston 64 for movement therewith is a piston rod 66, and this rod is secured directly to the armature 52. The piston, the rod and the armature are normally held in a raised position by a light coil spring 67. The piston 64 is provided with a one-way check valve 68. Upon the lowering of the armature oil will flow freely past the check valve 68. Return movement of the piston is retarded by the closing of the check valve.

Changes in details may be made without departing from the spirit or the scope of this invention, but what I claim as new is:

1. In combination with a welding helmet, a movable shutter and an arc circuit controlling apparatus, means for moving the shutter into eye protecting position including an electromagnet, an arc welding circuit including a welding electrode and the work, a normally open main switch in said arc welding circuit, means including an electromagnet for closing said switch after the shutter has moved into eye protecting position, a branch circuit including the first magnet energized upon the engagement of the weld rod with the work normally in series with the second magnet, means shunting the first magnet upon movement of the shutter to eye protecting position, whereby to bring about increased current value through the second magnet for energizing said second magnet to close the main switch.

2. In combination with a welding helmet, a movable shutter and an arc circuit controlling apparatus, means for moving the shutter into eye protecting position including an electromagnet, an arc welding circuit including a welding electrode and the work, a normally open main switch in said arc welding circuit, means including an electromagnet for closing said switch after the shutter has moved into eye protecting position, a branch circuit including the first magnet energized upon the engagement of the weld rod with the work normally in series with the second magnet, means shunting the first magnet upon movement of the shutter to eye protecting position, whereby to bring about increased current value through the second magnet for energizing said second magnet to close the main switch, and manual means for moving the shutter to an inoperative non-eye-protecting position.

3. In combination with a welding helmet, a movable shutter and an arc circuit controlling apparatus, means for moving the shutter into eye protecting position including an electromagnet, an arc welding circuit including a welding electrode and the work, a normally open main switch in said arc welding circuit, means including an electromagnet for closing said switch after the shutter has moved into eye protecting position, a branch circuit including the first magnet energized upon the engagement of the weld rod with the work normally in series with the second magnet, means shunting the first magnet including a switch actuated by the shutter moving to its eye protecting position, whereby to bring about increased current value through the second magnet and the energizing thereof for closing the main switch.

4. In combination with a welding helmet, a movable shutter and an arc circuit controlling apparatus, means for moving the shutter into eye protecting position including an electromagnet, an arc welding circuit including a welding electrode and the work, a normally open main switch in said arc welding circuit, means including an electromagnet for closing said switch after the shutter has moved into eye protecting position, a branch circuit including the first magnet energized upon the engagement of the weld rod with the work normally in series with the second magnet, means shunting the first magnet including a switch actuated by the shutter moving to its eye protecting position, whereby to bring about increased current value through the second magnet and the energizing thereof for closing the main switch, and manual means for moving the shutter to an inoperative non-eye-protecting position.

5. In combination with a welding helmet, a movable shutter and an arc circuit controlling apparatus, means for moving the shutter into eye protecting position including an electromagnet, an arc welding circuit including a welding electrode and the work, a normally open main switch in said arc welding circuit, means including an electromagnet for closing said switch after the shutter has moved into eye protecting position, a branch circuit including the first magnet energized upon the engagement of the weld rod with the work normally in series with the second magnet, means shunting the first magnet upon movement of the shutter to eye protecting position, whereby to bring about increased current value through the second magnet and the energizing of said second magnet for closing the main switch, the closing of the main switch also shunting certain windings of the second magnet.

6. A welding helmet comprising a shield having a visor including a stationary clear glass and vertically movable shutter including a dense dark glass and a depending shank, said shank having a keeper notch adjacent to its upper end and a trip lug adjacent to its lower end, spring means normally moving the shutter to a raised operative position, manual means for moving the shutter to a lowered non-operative position, a spring urged latch engageable with the keeper notch for normally holding the shutter in a lowered inoperative position, electromagnetic means for actuating the latch, and a normally open control switch on said shield having a leaf provided with a trip leg disposed in the path of the upward movement of the trip lug for closing said switch upon upward movement of the shutter to its operative position.

7. In combination with a welding helmet, a movable shutter and an arc circuit controlling apparatus, means for moving the shutter into eye protecting position including an electromagnet, an arc welding circuit including a welding electrode and the work, a normally open main switch in said arc welding circuit, means including an electromagnet for closing said switch after the shutter has moved into eye protecting position, a branch circuit including the first magnet energized upon the engagement of the weld rod with the work normally in series with the second magnet, means shunting the first magnet including a switch actuated by the shutter moving to its eye protecting position, whereby to bring about increased current values through the second magnet and the energizing thereof for closing the main switch, and means for retarding the opening of the main switch.

References Cited in the file of this patent
UNITED STATES PATENTS

| | | |
|---|---|---|
| 2,171,052 | Tatter | Aug. 29, 1939 |
| 2,471,719 | Broffitt et al. | May 31, 1949 |
| 2,582,860 | Clerke | Jan. 15, 1952 |